(12) United States Patent
Hirooka

(10) Patent No.: US 9,656,303 B2
(45) Date of Patent: May 23, 2017

(54) DEVICE AND METHOD FOR CLEANING CONVEYING SURFACE

(75) Inventor: Yuichi Hirooka, Fukushima (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 1067 days.

(21) Appl. No.: 13/516,477

(22) PCT Filed: Nov. 7, 2010

(86) PCT No.: PCT/JP2010/069759
§ 371 (c)(1),
(2), (4) Date: Jun. 15, 2012

(87) PCT Pub. No.: WO2011/074347
PCT Pub. Date: Jun. 23, 2011

(65) Prior Publication Data
US 2012/0255576 A1    Oct. 11, 2012

(30) Foreign Application Priority Data

Dec. 17, 2009  (JP) ................................ 2009-286269

(51) Int. Cl.
*B08B 1/02* (2006.01)
*B08B 1/00* (2006.01)
*B65G 45/10* (2006.01)

(52) U.S. Cl.
CPC .............. *B08B 1/008* (2013.01); *B65G 45/10* (2013.01)

(58) Field of Classification Search
CPC ................... B08B 1/008; B08B 1/02; B65G 45/10–45/26; B01D 21/04; B01D 21/12; B01D 21/18
(Continued)

(56) References Cited

U.S. PATENT DOCUMENTS 2,101,079 A * 12/1937 Lund ...................... B01D 21/04
                                                          210/527
2,101,080 A * 12/1937 Lund ...................... B01D 21/18
                                                          210/143
(Continued)

FOREIGN PATENT DOCUMENTS

JP      55-070620      5/1980
JP      60-117323      8/1985
(Continued)

OTHER PUBLICATIONS

International Search Report of Corresponding PCT Application PCT/JP2010/069759 mailed Dec. 7, 2010.
(Continued)

*Primary Examiner* — Michael Kornakov
*Assistant Examiner* — Marc Lorenzi
(74) *Attorney, Agent, or Firm* — Staas & Halsey LLP

(57) ABSTRACT

Labor saving and automatization of cleaning work of a conveyance face for articles or materials are intended to reliably and quickly execute the cleaning work. A cleaning apparatus has a cleaning implement (10) located on the upper side of a conveyance element (R). The cleaning implement includes a cleaning face (11) to be in contact with a conveyance face (S). The cleaning apparatus also has a traction device (6,7) which applies a tractive force (T) to the cleaning implement, in a direction (E) opposite to a conveyance direction (D) of a conveyance passage. The cleaning implement has a weight (P) for keeping the cleaning face in contact with the conveyance element in operation of the conveyor device, and cleans the conveyance face by means of contact and separation of the cleaning face and the conveyance face, and relative displacement therebetween (V1, V2, V3).

14 Claims, 12 Drawing Sheets

(58) Field of Classification Search
USPC .................. 15/256.51, 256.53; 198/496–499
See application file for complete search history.

(56) References Cited

U.S. PATENT DOCUMENTS

| | | | | |
|---|---|---|---|---|
| 2,101,081 | A | * | 12/1937 | Lund ...................... B01D 21/18 210/527 |
| 2,305,929 | A | * | 12/1942 | Lund et al. ............ B01D 21/12 210/525 |
| 2,329,559 | A | * | 9/1943 | Scott ...................... B01D 21/04 254/295 |
| 3,635,349 | A | * | 1/1972 | Weiss ..................... B01D 21/04 210/527 |
| 3,868,323 | A | * | 2/1975 | Fux ........................ B01D 21/12 210/154 |
| 3,976,213 | A | * | 8/1976 | Ball ....................... B60P 3/1025 414/462 |
| 4,019,217 | A | | 4/1977 | Schinke |
| 4,417,983 | A | * | 11/1983 | Smigerski .............. B01D 21/04 210/527 |
| 4,777,972 | A | * | 10/1988 | Adam ....................... B08B 3/02 134/172 |
| 4,993,538 | A | * | 2/1991 | Norbury ................ B65G 45/22 134/104.1 |
| 5,884,751 | A | | 3/1999 | Metivier |

FOREIGN PATENT DOCUMENTS

| | | | |
|---|---|---|---|
| JP | 03-018507 | | 1/1991 |
| JP | 3-87552 | | 9/1991 |
| JP | 05-228523 | | 9/1993 |
| JP | 08-175644 | | 7/1996 |
| JP | 10-045227 | | 2/1998 |
| JP | 2000-233822 | | 8/2000 |
| JP | 2000233822 A | * | 8/2000 ............. B65G 45/10 |
| JP | 2002-028580 | | 1/2002 |
| JP | 2002-220111 | | 8/2002 |
| JP | 2005-231816 | | 9/2005 |
| JP | 2007-055741 | | 3/2007 |
| JP | 2008-254831 | | 10/2008 |

OTHER PUBLICATIONS

Extended European Search Report dated May 28, 2014 in related European Patent Application No. 10837376.2 (10 pages).

Form PCT/ISA/237; Written Opinion of the International Searching Authority; mailed Dec. 7, 2010 in corresponding International Application No. PCT/JP2010/069759 (8 pages).

$1^{st}$ Notice of Reason for Rejection mailed on Jun. 13, 2011 in related Japanese Patent Application No. 2010-249240 (2 pages English Translation).

$2^{nd}$ Notice of Reason for Rejection mailed Aug. 17, 2011 in related Japanese Patent Application No. 2010-249240 (2 pages English Translation).

Decision to Grant Patent mailed Oct. 27, 2011 in related Japanese Patent Application No. 2010-249240, including English translation of granted claims (7 pages English Translation).

Decision to Grant Patent mailed Nov. 18, 2011 in related Japanese Patent Application No. 2011-210010, including English translation of granted claims (7 pages English Translation).

Canadian Office Action dated May 29, 2015 in related Canadian Patent Application No. 2,784,709 (4 pages).

* cited by examiner

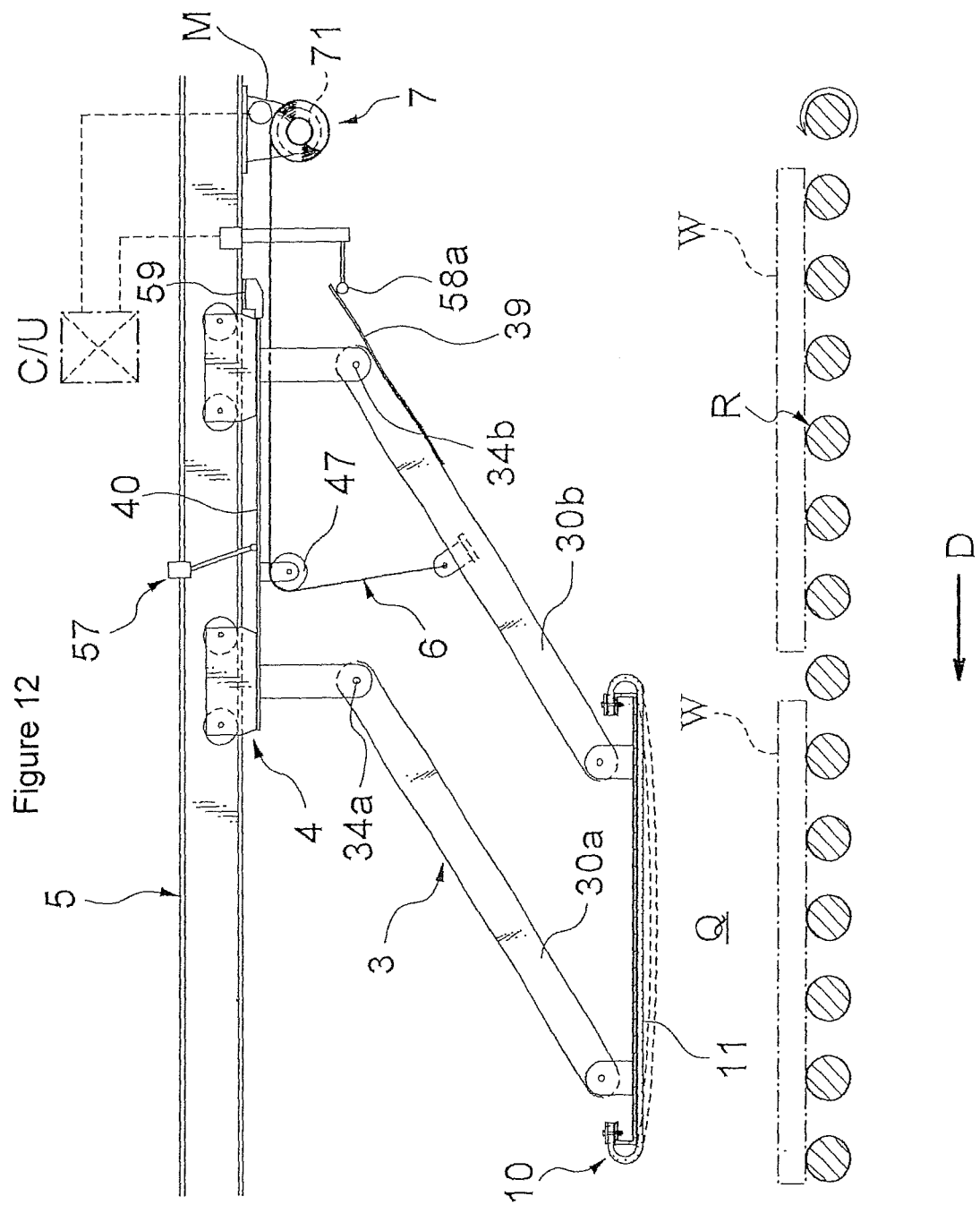

DEVICE AND METHOD FOR CLEANING CONVEYING SURFACE

CROSS REFERENCE TO RELATED APPLICATIONS

This application is a national phase application, under 35 U.S.C. 371, of international application No. PCT/JP2010/069759, filed on Nov. 7, 2010, which claimed priority to Japanese Patent Application No. 2009-286269, filed on Dec. 17, 2009, the disclosures of which are incorporated herein by reference.

TECHNICAL FIELD

The present invention relates to an apparatus and a method for cleaning a conveyance face, and more specifically, to such an apparatus and a method which achieve labor-saving, retrenchment or automatization of cleaning work for a conveying device, such as a roller conveyor or belt conveyor for conveying articles or materials, and which enables quick and reliable cleaning operation.

BACKGROUND ART

Raw materials, semi-processed products, half-finished products and the like, which are still in an unset, wet or reactive condition, are transferred on the conveyance line of a production or manufacture plant for a production or manufacture process of food products, building materials, resin moldings, paper products and so forth. The conveyance passage defining the conveyance line is formed by a continuous conveyor device, such as a roller conveyor or a belt conveyor.

For instance, materials, semi-processed products and so forth for production of food products, building materials and the like are transferred by a group of rollers, in a production or manufacture system. The group of rollers is constituted from a large number of conveyor rollers arranged in parallel, wherein the raw materials, powders, dusts, liquids, viscous matters and so forth cling onto the surfaces of the rollers as dirt or contaminants. Therefore, it is necessary to periodically clean the respective rollers and appropriately remove such dirt or contaminants therefrom. However, such cleaning work depends on manual operation in which an operator manually wipes the surface of each of the rollers, using pieces of waste cloth, scrapers and so forth.

For example, a scraper constituted from a scraping member and a grip attached to the scraping member is disclosed in Japanese Patent Laid-Open Publication No. 2007-55741 (JP2007-55741). The scraping member is provided with a contact face, which has a generally arched form corresponding to the profile of a roller of a roller conveyor. The scraping member is used as a tool for manually cleaning each of the surfaces of the respective rollers. In use, the contact face is brought into surface-to-surface contact with the surface of each of the rollers in such a manner that the dirt clinging to the surface of the roller is scraped or rubbed to be removed therefrom.

Cleaning devices intended to achieve reduction of labor or automatization of such cleaning work for quickly and reliably finishing the cleaning work are disclosed in, e.g., Japanese Utility-Model Laid-Open Publication No. 60-117323 (JUM60-117323) and Japanese Patent Laid-Open Publication Nos. 55-70620 (JP55-70620) and 2002-28580 (JP2002-28580).

The cleaning device for a conveyor belt disclosed in JUM60-117323 has rotary brush rollers driven in rotation and arranged in parallel with a roller of a conveyor belt. The dirt or contaminant clinging to the conveyor belt is removed by a large number of brushes on the brush rollers rotating at high speed.

The cleaning device for a roller conveyor disclosed in JP55-70620 has a movable tube located above the roller conveyor, a hollow panel attached to an underside of the tube, and a vacuum pump connected to the tube. The hollow panel has a rotary brush driven in rotation. The panel is in communication with the vacuum pump through the tube, and the brush is in contact with a surface of the roller of the conveyor to remove the dirt on the rollers therefrom. The tube is generally moved with respect to the roller conveyor, and the hollow panel is moved along the tube while the brush is rotated at high speed. The hollow panel sucks the dust and the like from the surface of the rollers and removes it therefrom.

The cleaning device for a roller conveyor disclosed in JP2002-28580 has a movable carrier travelling on a rail which is positioned under the roller conveyor, a lifting device mounted on the carrier, and a cleaner attached to the lifting device. The cleaning device causes the carrier to move to an area immediately below a roller to be cleaned, and then, it causes the cleaner to be lifted by the lifting device, whereby the cleaning cloth of the cleaner is brought into contact with a lower-side face of the roller. The cleaning cloth is in contact with a peripheral surface of the roller (its lower-side face), so that the matter clung to the peripheral surface of the roller is wiped by the cloth.

CITATION LIST

[Patent Literature 1] Japanese Patent Laid-Open Publication No. 2007-55741
[Patent Literature 2] Japanese Utility-Model Laid-Open Publication No. 60-117323
[Patent Literature 3] Japanese Patent Laid-Open Publication No. 55-70620
[Patent Literature 4] Japanese Patent Laid-Open Publication No. 2002-28580

SUMMARY OF INVENTION

Technical Problem

However, the manual work for cleaning the surfaces of the rollers with use of the cleaning tool (JP2007-55741) requires a great deal of labor and time, and therefore this is unpreferable from the point of view of labor-saving and automatization in production or manufacture facilities. In addition, it is necessary to interrupt a production or manufacture process for a long time during the cleaning work, and this is unpreferable from the viewpoint of efficient production or manufacture.

According to the cleaning device having the rotary brush driven in rotation as in JUM60-117323 and JP55-70620 or the movable cleaner as in JP2002-28580, it might be possible to reliably and quickly finish the cleaning work with the labor-saving and automatization of the cleaning work, thereby overcoming the aforementioned drawbacks of the manually-operated cleaning work.

However, in order to clean the rollers or belts throughout the whole conveyance passage by the rotary brush as in JUM60-117323 and JP55-70620, a rotary drive device or a power transmission mechanism for rotating the brush has to be transferred together with the brush, and therefore, it is necessary to locate in the conveyance passage, an extremely large-scale and complicated device for transferring the brush.

On the other hand, the cleaning device as in JP2002-28580, in which the lifting device and the cleaner are transferred by means of the rail located under the roller conveyor and the cloth is brought into contact with the rotating roller, might be able to overcome the problems involved in transfer of such a driving device or a power transmission mechanism.

However, the cleaning device with such an arrangement needs a transfer drive mechanism for transferring the lifting device and the cleaner in the direction of the conveyance passage, and a lifting drive mechanism for lifting the cleaner. Therefore, the structure or arrangement of the cleaning device is complicated, and further, two kinds of control systems are required for controlling these two kinds of driving mechanisms.

In addition, various kinds of devices, parts, members or the like constituting the conveyor device are, in general, located in the area under the conveyance passage, and therefore, it is difficult to ensure a rail zone (a movable zone for the cleaner) throughout an overall length of the conveyance passage. Further, it is difficult to perform maintenance work in the area under the conveyance passage. Therefore, it is unpreferable in terms of maintenance and conservation that such equipment or mechanisms, e.g. the rail, the cleaner and the like, be located immediately under the conveyance passage, from an aspect of their maintenance and conservation.

It is therefore an object of the present invention to provide an apparatus and a method of cleaning a conveyance face for conveying articles or materials, which can achieve labor-saving and automatization of the cleaning work intended to enable reliable and quickly executable cleaning work, and which enables cleaning of the conveyance face by a cleaning implement located on the upper side of the conveyance face without the need of complicated driving mechanisms, such as a rotary drive device, a transfer drive mechanism, a lifting drive mechanism and so forth.

Solution to Problem

The present invention provides an apparatus of cleaning a conveyance face for conveying articles or materials, which is brought into contact with a conveyance element of a conveyor device so as to clean the conveyance element having the conveyance face, comprising:

a cleaning implement (10) which has a cleaning face (11) to be placed on the conveyance element (R) and to be brought into contact with the conveyance face (S); and a traction device (6,7) applying to the cleaning implement, a tractive force (T) in a direction (E) opposite to a conveyance direction (D) of said conveyor device;

wherein said cleaning implement has a weight (P) for keeping said cleaning face in contact with said conveyance face in operation of the conveyor device.

According to the apparatus of the present invention, the cleaning implement is placed on the conveyance face during operation of the conveyor device, wherein contact between the cleaning face and the conveyance element is maintained by the weight of the cleaning implement. When the tractive force is reduced or eliminated, the cleaning implement is moved in the conveyance direction by conveyance power transmitted from the conveyor element to the cleaning implement. That is, the cleaning implement is passively moved forward on the conveyance face by the conveyance power of the conveyor device. When the tractive force is increased, the cleaning implement moves backward against the conveyance power of the conveyor device transmitted to the cleaning implement from the conveyor element. The conveyance face is cleaned by the cleaning face, owing to contact and separation of the cleaning face and the conveyance face, and owing to relative displacement occurring therebetween, in such forward and backward movement.

The present invention also provides a method of cleaning a conveyance face for conveying articles or materials, wherein a conveyance element of a conveyor device having the conveyance face is cleaned by a cleaning face of a cleaning implement, comprising the steps of:

placing the cleaning implement (10) on the conveyance element (R) so that the cleaning face (11) of the cleaning implement is brought into contact with the conveyance face (S) by weight of the cleaning implement, thereby transmitting conveyance power (F) of said conveyor device to said cleaning implement; and cleaning said conveyance face by contact and separation of the cleaning face and the conveyance face and relative displacement therebetween, wherein the contact, separation and displacement depend on a difference between a moving velocity (V1) of the conveyance face and a moving velocity (V2, V3) of the cleaning implement.

According to the cleaning method of the present invention, the conveyance power of the conveyor device is transmitted to the cleaning implement by the contact between the cleaning face and the conveyance face, whereby the cleaning implement moves on the conveyance face. The conveyance face is cleaned by the contact and separation of the cleaning face and the conveyance face, and the relative displacement therebetween.

Thus, according to the present invention, the cleaning work can be reliably and quickly performed under the labor-saving and automatized condition independently of manual operation, since the cleaning work over a relatively wide area of the conveyance face can be executed with use of the conveyance power of the conveyor device and the weight of the cleaning implement. Further, according to the present invention, the active power required by the cleaning apparatus is only the tractive force of the traction device, and therefore, the cleaning apparatus does not need a complicated driving mechanism. Furthermore, according to the present invention, the cleaning implement is located on the upper side of the conveyance face and is in contact with the upper face of the conveyance passage. Therefore, the cleaning implement does not interfere with equipment, elements, members and so forth located under the conveyance passage, and thus, the maintenance and conservation of the cleaning apparatus can be relatively readily performed.

Advantageous Effects of Invention

According to the present invention, labor-saving and automatization of the cleaning work of the conveyor device for articles or materials can be achieved to be intended to reliably and quickly execute the cleaning work, and the conveyance face can be cleaned by the cleaning implement which is located on the upper side of the conveyance face and which does not require complicated mechanisms, such as a rotary drive device, a transfer drive mechanism, a lifting drive mechanism and so forth.

BRIEF DESCRIPTION OF DRAWINGS

FIG. 12 is a front elevational view showing a positional relation among the cleaning unit, the stopper and the position sensor, which are illustrated in a condition that the cleaning implement is raised up to its lifted position (a standby position).

DESCRIPTION OF EMBODIMENTS

Figure 1:
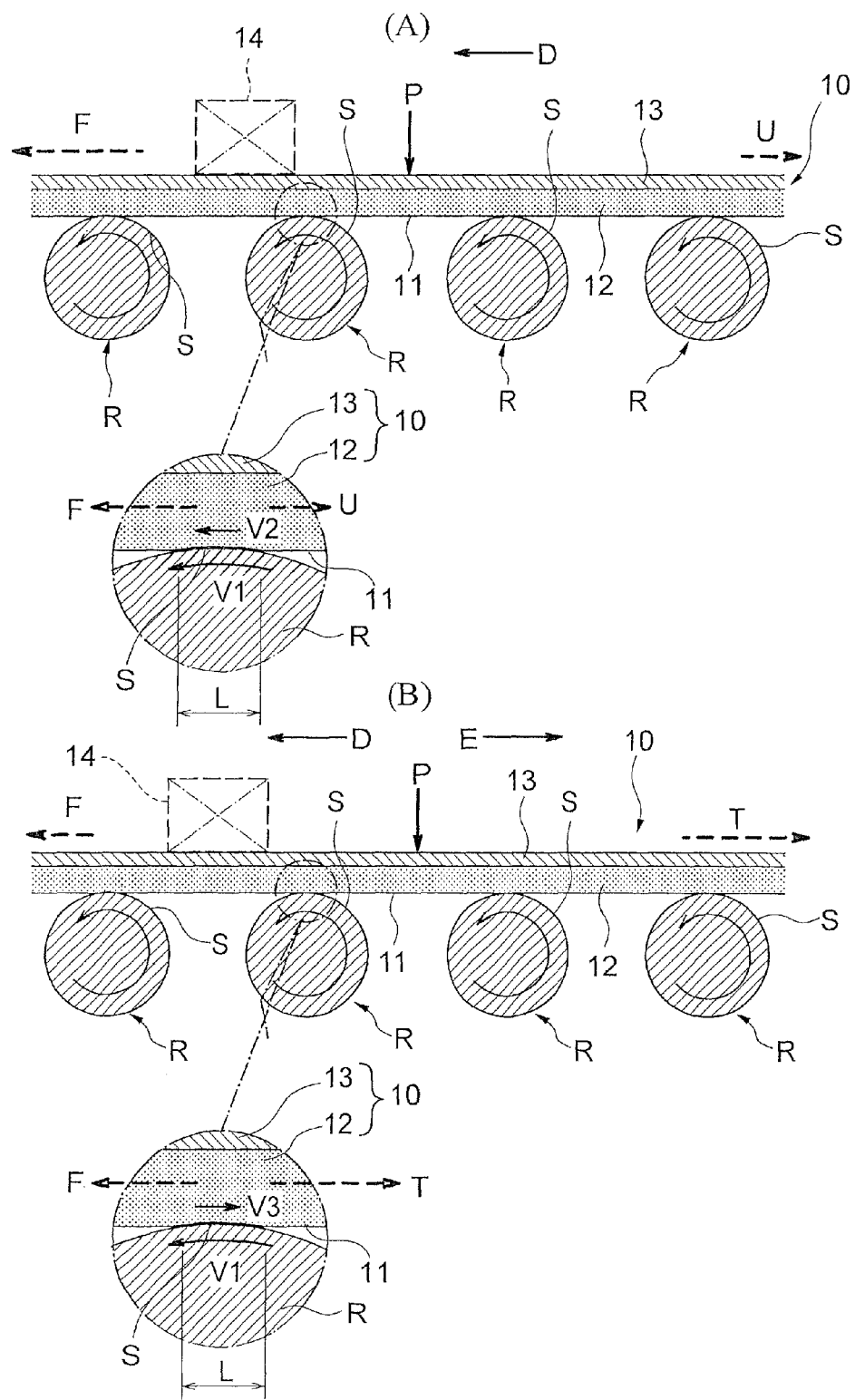
FIG. 1 is an explanatory cross-sectional view showing a principle of a cleaning apparatus according to the present invention.

In a preferred embodiment of the present invention, the cleaning implement (10) is constituted from a rigid plate (13) with high rigidity and a flexible cleaning member (12) extending underneath the rigid plate. A load is applied to the cleaning member through the rigid plate, so that the load acts to maintain surface-to-surface contact or linear contact between the cleaning member and the conveyance element (R) while the conveyor device is in operation. Preferably, the cleaning member is made of or from a material having a water-absorbing property.

If desired, the conveyance face is fed with cleansing liquid. The cleaning implement may be provided with cleansing liquid supply means for supplying the cleansing liquid to the conveyance face, air-drafting or forcibly drying means for positively drying the conveyance face, liquid-absorbing means for absorbing surplus liquid on the conveyance face quickly, and so forth.

Preferably, the cleaning apparatus has a guide member (5) located above the conveyance face in parallel with the conveyance direction, and a suspension mechanism (3,4) for movably suspending the cleaning implement from the guide member, whereby the cleaning implement is guided in the conveyance direction of the conveyor device. More preferably, the suspension mechanism is constituted from a travelling mechanism (4) movably supported by the guide member, and a linkage mechanism (3) connecting the travelling mechanism and the cleaning implement.

In a further preferred embodiment of the present invention, the traction device (6, 7) has cable means (6) for transmitting the tractive force (T) to the cleaning implement, and a winch (7) winding or unwinding the cable means, wherein the cable means extends along the guide member and the cable means is connected with the cleaning implement through the suspension mechanism. Preferably, cable support devices (53, 54) for intermediately supporting the cable means are located on the guide member between the traction device and the cleaning implement, spaced a distance from each other. More preferably, position detecting means (55) is provided, for detecting a position of the cleaning implement in order to control the cable support device. The cable support device selectively supports the cable means on the basis of a position of the cleaning implement detected by the position detecting means.

In a preferred embodiment of the present invention, the traction device moves the cleaning implement backward to its initial position (X1) on the conveyor device by means of the tractive force, after the cleaning implement moves a predetermined distance forward in the conveyance direction. Thereafter, the traction device converts a whole or a part of the tractive force to an upward force for lifting the cleaning implement, whereby the cleaning implement returns to its standby position above the conveyance face. The lifted cleaning implement allows a space for conveyance (Q) to be ensured under the cleaning implement for conveyance of the articles or materials, when cleaning is not performed.

Preferably, braking means (59) for blocking the movement of a travelling member in the direction of the tractive force is provided on the guide member. The linkage mechanism connecting the travelling mechanism and the cleaning implement is upwardly swung to lift the cleaning implement, by means of the tractive force which acts on the linkage mechanism while the movement of the traveling member is blocked by the braking means.

In a further preferred embodiment of the present invention, the cleaning implement has position detecting means (56, 57, 58) for detecting the position of the cleaning implement in order to control the tractive force, and control means (C/U) for controlling the tractive force to be applied to the cleaning implement by the traction means, on the basis of the detected result of the position detecting means. For instance, the traction device causes the cleaning implement to move in the conveyance direction (D) with the tractive force being reduced or released, whereas the traction device causes the cleaning implement to move in the direction (E) opposite to the conveyance direction with the tractive force being increased or applied. That is, the movement of the cleaning implement is in correspondence with or in response to the control of the tractive force.

Embodiment

With reference to the attached drawings, a preferred embodiment of the present invention is described hereinafter.

FIG. 1 is the explanatory cross-sectional view illustrating the principle of the cleaning apparatus according to the present embodiment. FIG. 1(A) shows a condition where the cleaning implement of the cleaning apparatus is moved in a conveyance direction by conveyance power of a roller conveyor. FIG. 1(B) shows a condition where the cleaning implement is moved in a backward direction against the conveyance power of the roller conveyor.

Rollers R of the roller conveyor as shown in FIG. 1 defines a conveyance passage. Each of the rollers R has an upper-side conveyance face S on its upper side which is in surface-to-surface contact or linear contact with materials or articles to be conveyed (not shown). The cleaning implement 10 constituting the cleaning apparatus is placed on the rollers R, so that a cleaning face 11 located on the underside of the implement 10 is in contact with the roller R. In this embodiment, the implement 10 is generally configured to have a plate-like or panel-like form. A bottom face of the cleaning implement 10 has an approximately square or rectangular profile as seen from its underside. A dimension of the bottom face measured in the conveyance direction is so set as to extend over at least two rollers R (e.g., five to ten rollers R). A dimension of the bottom face measured in a transverse direction of the conveyance passage is set to be slightly smaller than the width of the conveyance passage, which corresponds to the length of the roller R.

The cleaning implement 10 is constituted from the cleaning member 12 provided with the cleaning face 11 and a rigid plate 13 located on the upper side of the member 12. In this embodiment, the cleaning member 12 is made of a relatively thick and flexible material having a water-absorbing property, such as a thick woven fabric, nonwoven fabric, felt material, porous material, sponge material, or aggregated fibers formed in a cloth-like configuration. The plate 13 is made of a high rigid metal plate, such as a resin-coated metal plate. A dead load P of the cleaning implement 10 causes the cleaning face 11 to be pressed against the conveyance face S to be in intimate contact therewith. The cleaning member 12 is deformed so that the cleaning face 11 is brought into surface-to-surface contact with the conveyance face S in a range of the length L. The range of the length L defines a belt-like zone extending in a direction of an axis of the roller R. In a case where the cleaning member 12 is hard and the length L is extremely small, the cleaning member 12 is in substantially linear contact with the conveyance face S. Dirt or contaminant clinging to the conveyance face S of the roller R is removed therefrom and transferred to the cleaning member 12 by the water-absorbing property of the cleaning member 12, a relative displacement of the cleaning face 11 and the conveyance face S, and contact and separation of the faces 11, S resulting from the relative displacement therebetween.

FIG. 1(A) illustrates a state that the cleaning implement 10 is loaded on the roller conveyor under the dead load P of the implement 10. Torque of the roller R is transferred to the cleaning implement 10 as conveyance power F by means of the surface-to-surface contact or the liner contact of the faces 11, S. The dead load P of the implement 10 acts as drag U against the conveyance power F, in a direction opposite to the conveyance direction D. The drag U acts in the direction so as to balance the conveyance power F with the drag U, but the power F overcomes the drag U so that the movement of the implement 10 substantially depends on the power F. Thus, the implement 10 slowly moves in the direction D (the conveyance direction). The load P of the implement 10 is substantially determined by the mass of the rigid plate 13. If the cleaning face 11 is apt to lift or separate from the face S for a shortage of the mass of the plate 13, a weight 14 (shown by phantom lines) having the appropriate mass is additionally mounted in an appropriate position of the implement 10, such as an upper surface of the plate 13.

As shown in FIG. 1(B), a tractive force T is applied to the cleaning implement 10 in a direction opposite to the conveyance direction D, and the implement 10 is moved in a reverse direction E, against the conveyance power of the roller conveyor, wherein the tractive force T overcomes the conveyance power F, so that a relative displacement occurs between the cleaning face 11 and the conveyance face S in opposite directions. The tractive force T is applied to the plate 13 by tractive cable means as described later (e.g., a metal cable, a wire or the like).

As shown in enlarged views included in FIG. 1, velocity differences (V1-V2) and (V1-V3) between a circumferential velocity V1 of the roller R and a moving velocity V2, V3 of the cleaning implement 10 is caused by the drag U and/or the tractive force T, so that the relative displacement of the faces S, 11 occurs. In particular, such a displacement is significantly caused in a case where the cleaning implement 10 is pulled in the direction E opposite to the conveyance direction D as shown in FIG. 1 (B). This displacement causes the cleaning face 11 to wipe the conveyance face S or to be in rubbing or sliding contact therewith, so that the dirt or contaminant on the face S is surely removed.

Figure 2:
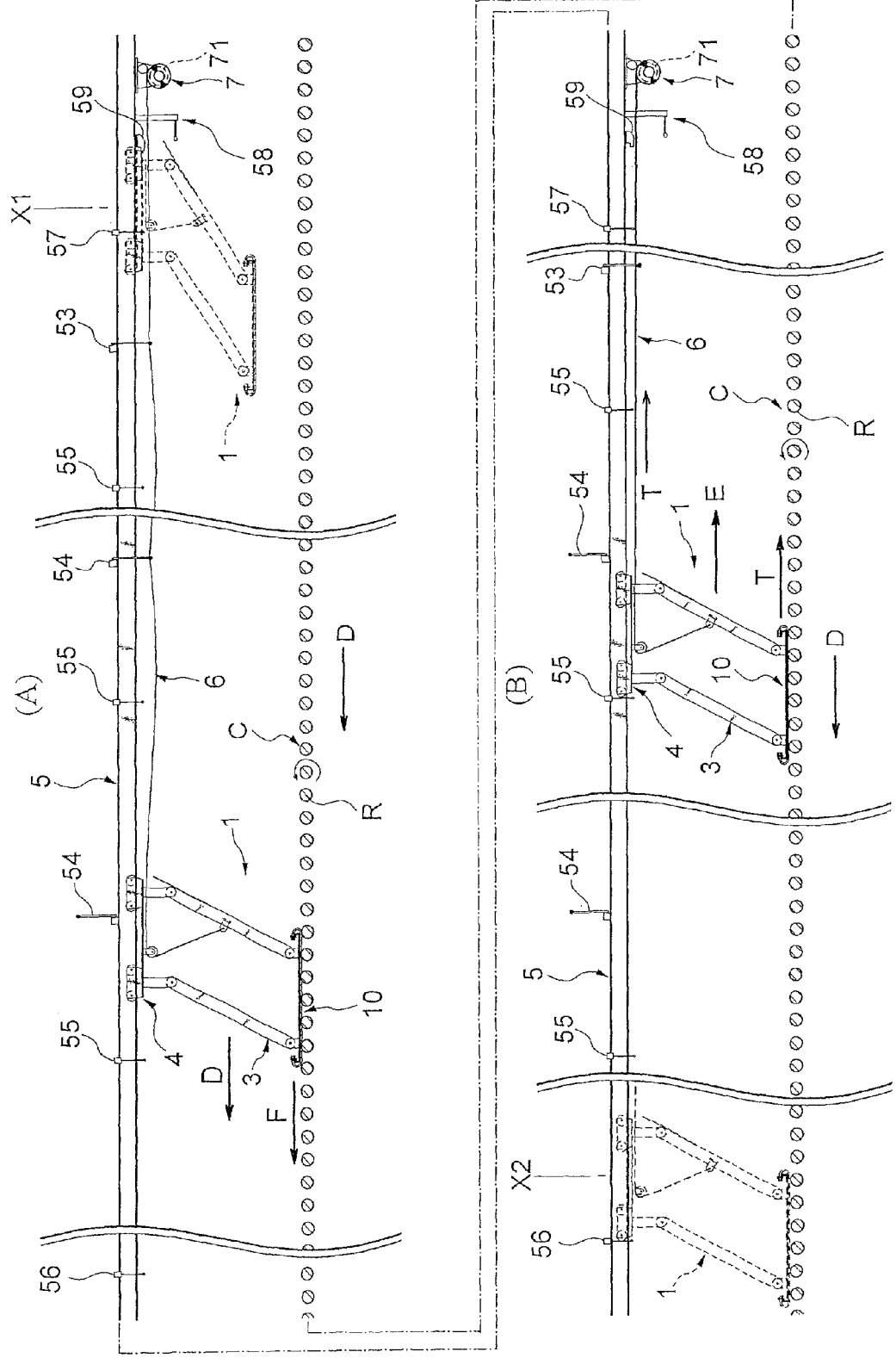
FIG. 2 is a front elevational view showing an overall arrangement of the cleaning apparatus provided with a cleaning implement as shown in FIG. 1.
Figure 3:
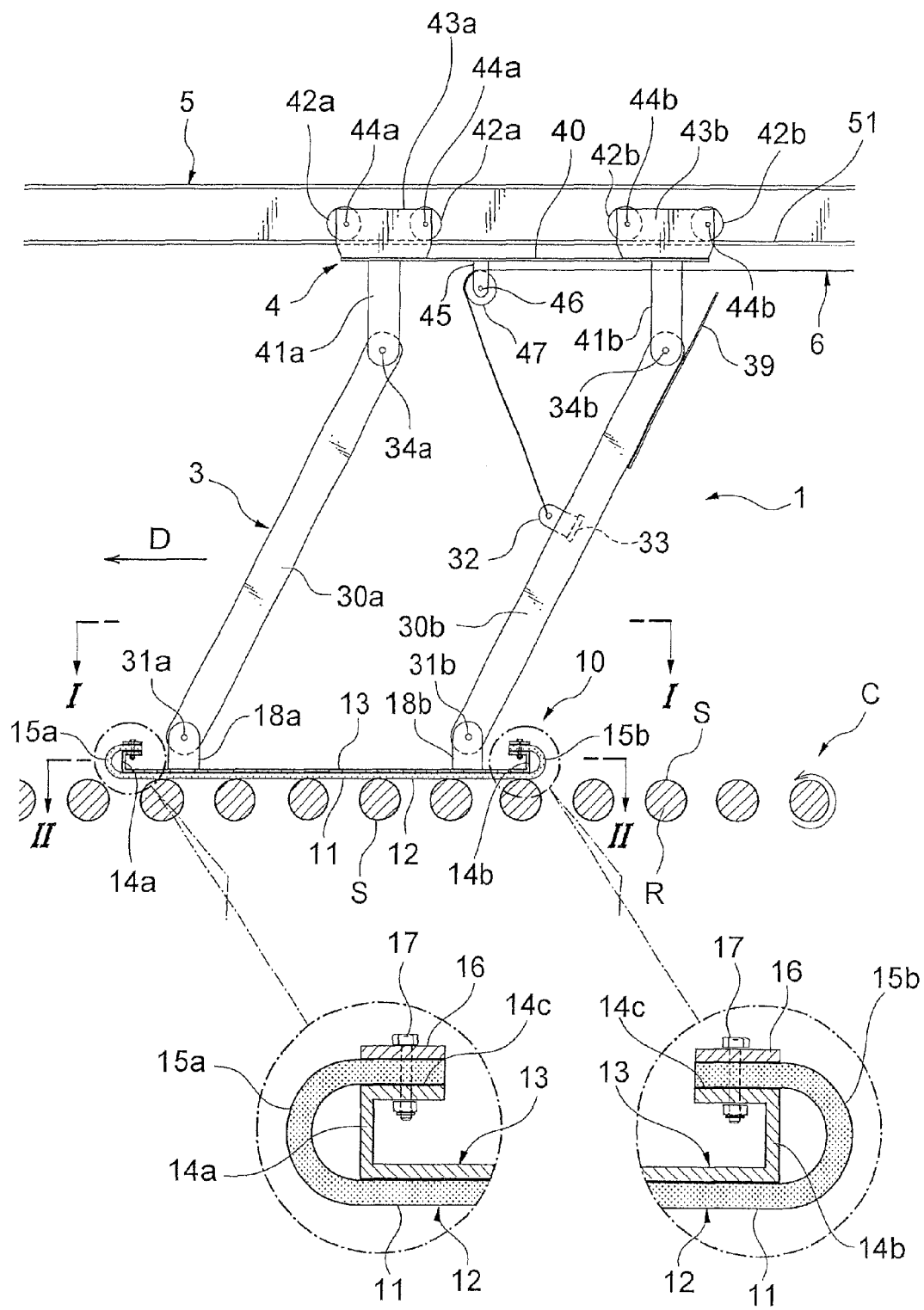
FIG. 3 is a front elevational view showing the structure of a cleaning unit as shown in FIG. 2.
Figure 4:
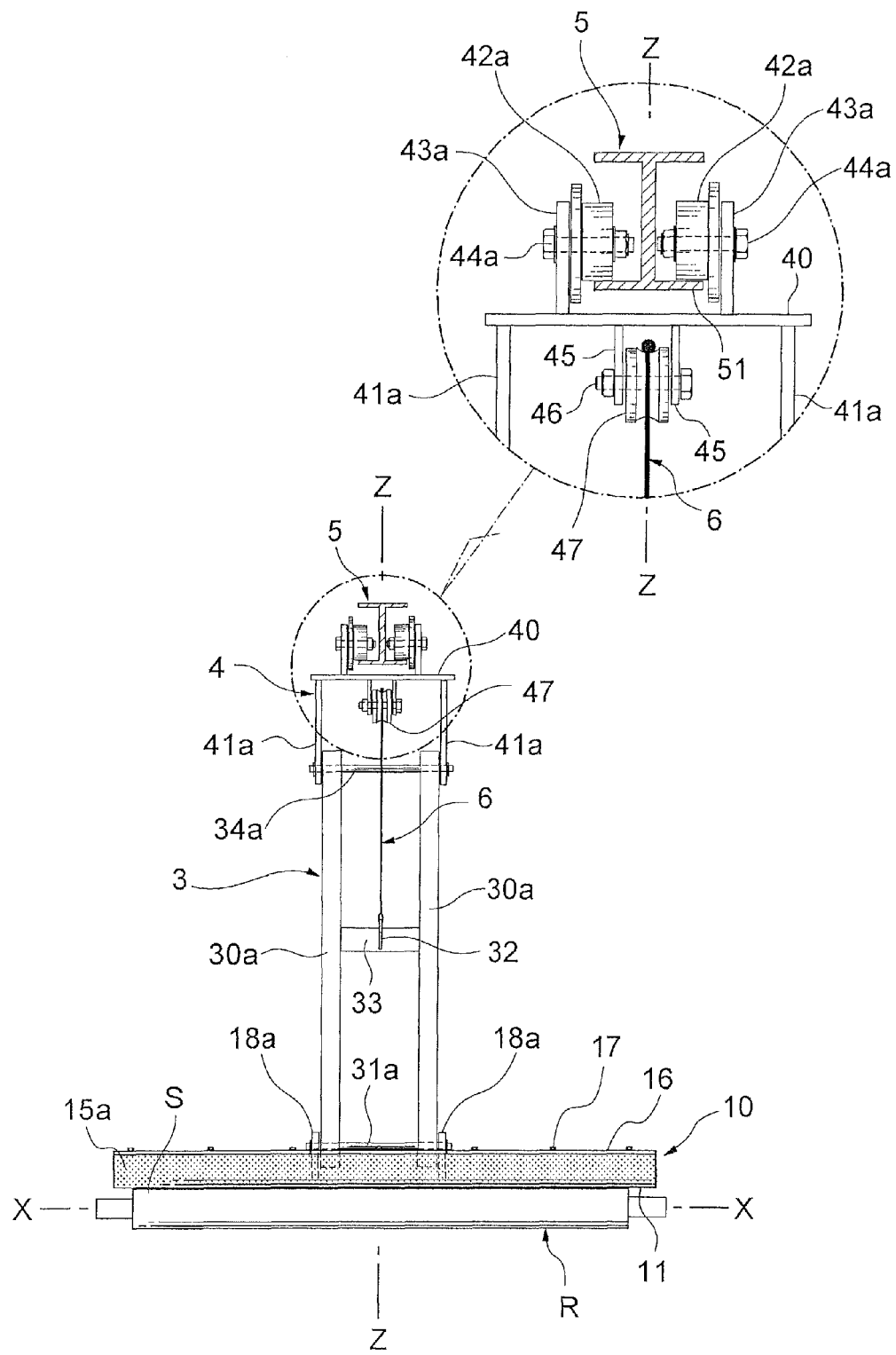
FIG. 4 is a side elevational view showing the structure of the cleaning unit as shown in FIG. 2.
Figure 5:
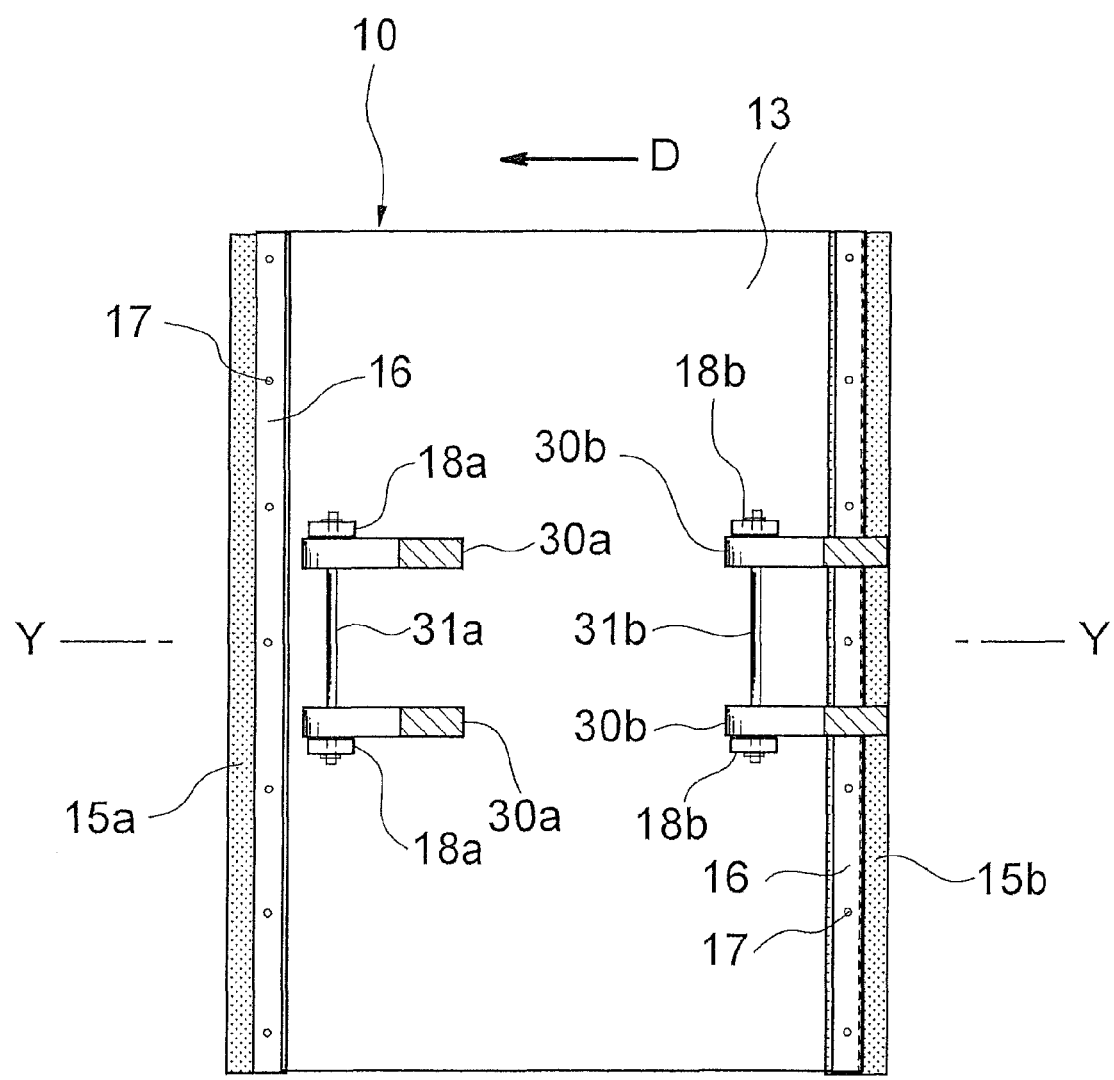
FIG. 5 is a cross-sectional view of the cleaning unit taken along a line I-I shown in FIG. 3.
Figure 6:
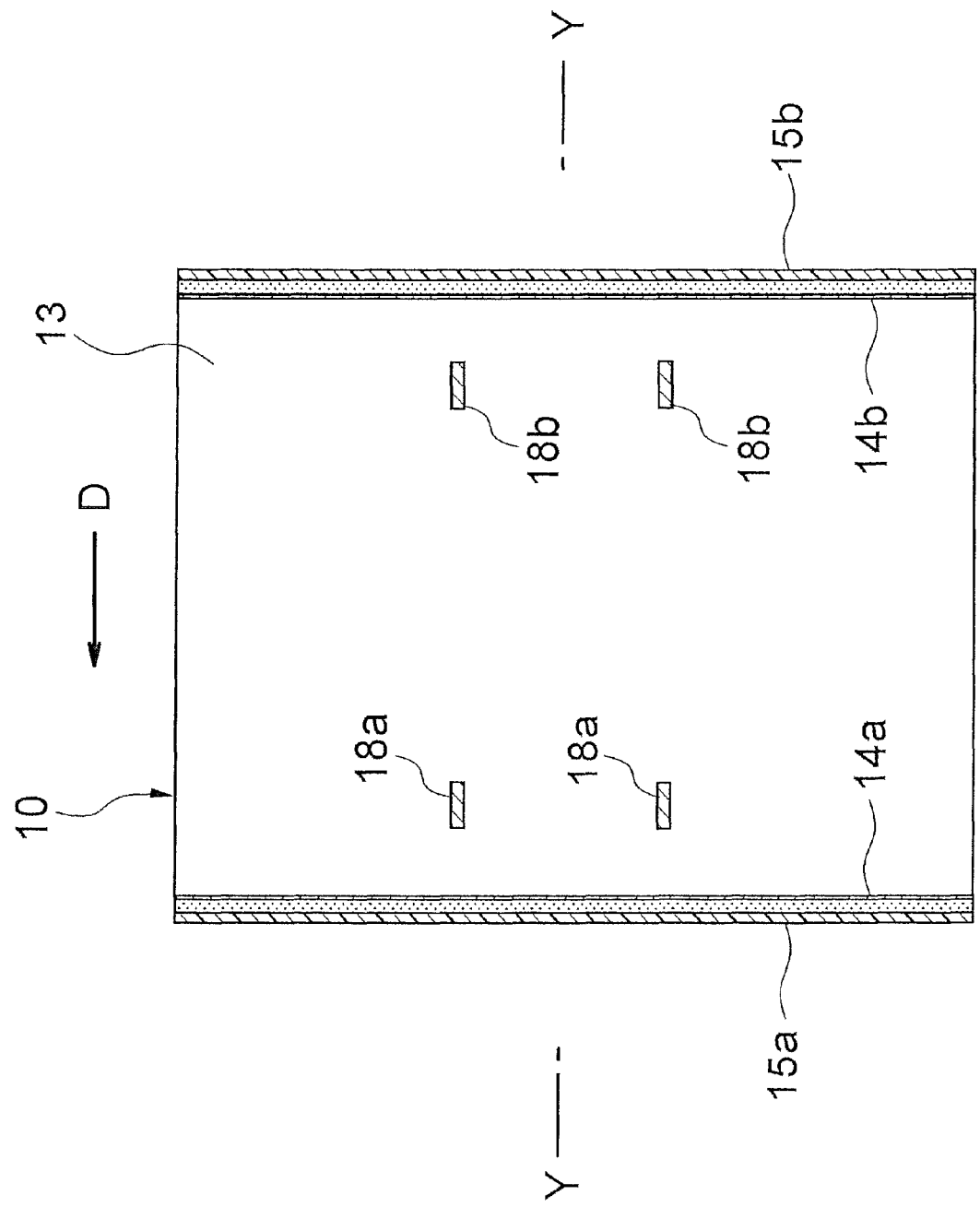
FIG. 6 is a cross-sectional view of the cleaning unit taken along a line II-II shown in FIG. 3.
Figure 7:
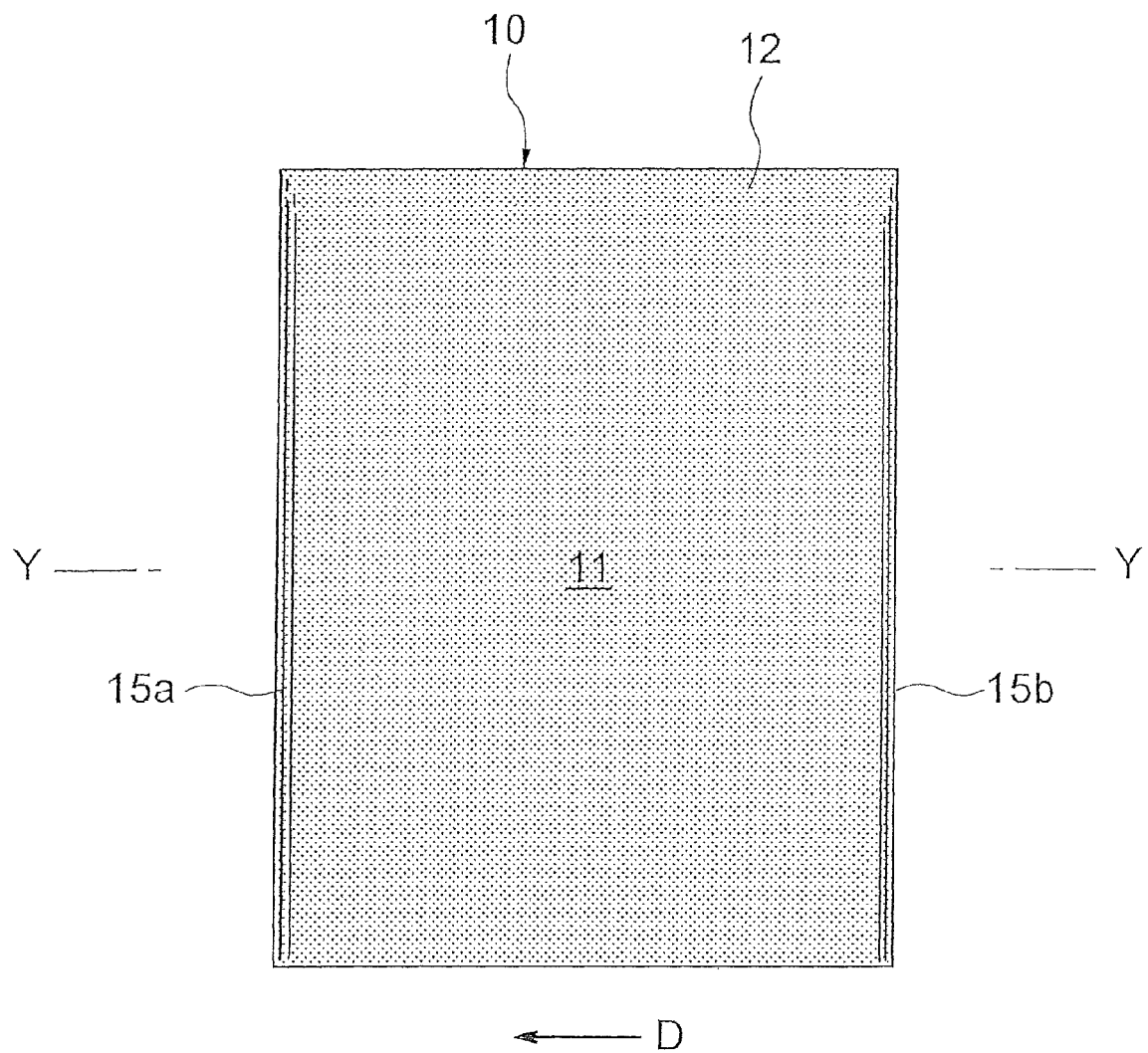
FIG. 7 is a bottom view of the cleaning implement.

FIG. 2 is the front elevational view showing the overall arrangement of the cleaning apparatus with the cleaning implement 10 as shown in FIG. 1, and FIGS. 3 and 4 are the front and side elevational views showing the structure of a cleaning unit as shown in FIG. 2. FIGS. 5 and 6 are the cross-sectional views taken along the lines I-I and II-II shown in FIG. 3, and FIG. 7 is the bottom view of the implement 10.

FIG. 2(A) is the front elevational view illustrating a cleaning process in which the cleaning unit 1 having the cleaning implement 10 is moved in the conveyance direction D to clean the rollers R. FIG. 2(B) is the front elevational view illustrating the cleaning process in which the unit 1 is moved in the direction E opposite to the direction D to clean the rollers R. In FIG. 2(A), a state (a standby position) of the unit 1 in its inoperative condition (a standby condition) is shown by dotted lines. In FIG. 2(B), a state (a reversing position) of the unit 1 reaching a distal end of a conveyance passage to be cleaned is shown by dotted lines. The unit 1 moves between its initial position X1 (FIG. 2(A)) and its forwardmost position X2 (FIG. 2(B)).

As shown in FIG. 2, the cleaning apparatus comprises the transportable cleaning unit 1 located on the roller conveyor C; an I-beam or H-beam type of trolley beam 5 (referred to as "trolley 5" hereinafter) for suspending the unit 1; a cable means 6 (referred to as "cable 6" hereinafter), such as a metal cable or wire, extending along the trolley 5; and an electric winch 7 for reeling up or out the cable 6. The trolley 5 extends in parallel with the conveyance direction D. The unit 1 has an arrangement in that the cleaning implement 10 is suspended from the trolley 5 by a movable linkage mechanism 3 and a transportable trolley device 4. The trolley 5 carries the unit 1 movably in the conveyance direction D of the conveyor C. The cable 6 and the winch 7 tow the unit 1 in the direction (the reverse direction E) opposite to the conveyance direction D.

In FIGS. 3 to 7, the structure of the cleaning unit 10 is illustrated.

The cleaning unit 1 has a bilateral symmetry configuration with respect to a vertical centerline Z-Z (FIG. 4) and a horizontal center line Y-Y (FIGS. 5, 6). The centerline Y-Y is in parallel with the directions D and E.

As shown in FIG. 3, the rigid plate 13 of the cleaning implement 10 is made of a metal plate having a high rigidity, which is provided with forward and rearward edge portions 14a, 14b formed by upward bending. The cleaning member 12 of the implement 10 is a water-absorptive flexible web provided under the plate 13. Forward and rearward edge portions 15a, 15b of the cleaning member 12 are deformed upward by bending under its flexibility, and are securely fixed onto upper faces 14c of the edge portions 14a, 14b by means of metal strips 16 and nut and bolt assemblies 17.

As shown in FIG. 3, forward and rearward vertical brackets 18a, 18b are fixed in pairs on an upper surface of the rigid plate 13 in order to connect the plate 13 with the movable linkage mechanism 3. As shown in FIGS. 4 and 5, a pair of forward brackets 18a and a pair of rearward brackets 18b are positioned symmetrically with respect to the vertical and horizontal centerlines Z-Z, Y-Y. The linkage mechanism 3 has a pair of forward and rearward linkage members 30a, 30b, as shown in FIG. 3. The forward linkage members 30a in a pair and the rearward linkage members 30b in a pair are positioned symmetrically with respect to the centerlines Z-Z, Y-Y, respectively. Horizontal pivot shafts 31a, 31b extending in a widthwise direction of the conveyance passage (a direction perpendicular to the conveyance direction) extends through upper-end portions of the brackets 18a, 18b and lower-end portions of the linkage members 30a, 30b. The brackets 18a, 18b and the linkage members 30a, 30b are connected with each other so as to pivot about axes of the shafts 31a, 31b, respectively. The cleaning implement 10 can be relatively readily removed therefrom or exchanged with another by removing or disengaging the shafts 31a, 31b.

As illustrated in FIGS. 3 and 4, the movable linkage mechanism 3 is provided with an anchoring member 32 for anchoring a leading end of the cable 6. The anchoring member 32 is fixed to a connector member 33 positioned in an intermediate level of the mechanism 3. The connector member 33 is fixed to each of the rearward linkage members 30b perpendicularly thereto so as to connect the left and right members 30b with each other, and the member 33 extends horizontally between the left and right members 30b.

As shown in FIG. 3, upper-end portions of the linkage members 30a, 30b are connected with the transportable trolley device 4 by means of pairs of forward and rearward vertical brackets 41a, 41b. The forward brackets 41a in a pair and the rearward brackets 41b in a pair are positioned symmetrically with respect to the vertical centerlines Z-Z, as shown in FIG. 4. The trolley device 4 is provided with an elongated horizontal base-plate 40 having a length substantially equal to the length of the rigid plate 13. Upper-end portions of the brackets 41a, 41b are integrally fixed to forward and rearward end portions of the base-plate 40, respectively. Horizontal pivot shafts 34a, 34b extend in the widthwise direction of the conveyance passage, and extend through lower-end portions of the brackets 41a, 41b and the upper-end portions of the linkage members 30a, 30b. The brackets 41a, 41b and the linkage members 30a, 30b are connected with each other so as to pivot about axes of the shafts 34a, 34b.

Brackets 43a are fixed on an upper surface of a forward-end portion of the horizontal base-plate 40, and the brackets 43a carry a plurality of (a pair of) wheels 42a by means of a plurality of (a pair of) horizontal shafts 44a. Also, brackets 43b are fixed on an upper surface of a rearward-end portion of the base-plate 40, and the brackets 43b carry a plurality of (a pair of) wheels 42b by means of a plurality of (a pair of) horizontal shafts 44b. As shown in FIG. 4, the brackets 43a, 43b and the wheels 42a, 42b are located on both sides of the trolley 5, in pairs. Each of the wheels 42a, 42b takes a rolling action on a lower flange 51 of the trolley 5.

A pulley 47 for turning the cable 6 is located beneath the horizontal base-plate 40. The pulley 47 is carried by a horizontal shaft 46 extending in the widthwise direction of the conveyance passage. The shaft 46 is rotatably supported by left and right brackets 45 in a pair, which depend from a center part of the base-plate 40. As illustrated in FIG. 3, the cable 6 extends obliquely upward and forward from the anchor 32, and turns rearward by means of the pulley 47, and then extends rearward along the underside face of the trolley 5.

As shown in FIG. 2, a proximal end portion (rearward-end portion) of the cable 6 is wound on a drum 71 of the electric winch 7. The cable support devices 53, 54 for intermediate support of the cable 6 are positioned on the trolley 5, spaced a predetermined distance from each other. The trolley 5 is provided with position sensors 55, 56, 57 and an attitude detecting sensor 58 located at predetermined positions of the trolley 5 for detecting the position or attitude of the cleaning unit 1. The position sensors 55 on the trolley 5 are spaced apart from each other. The position sensors 55 defines position detecting means for detecting the position of the cleaning unit 1 in order to control the operation of each of the cable support devices 53, 54. The position sensor 56 is positioned at a forward-end portion of the trolley 5 in order to detect the forwardmost position X2 (the reversing position) of the cleaning unit 1. The position sensor 57 is positioned at a rearward-end portion of the trolley 5 in order to detect a speed reduction position in a recovery motion (final motion) of the cleaning unit 1. The attitude detecting sensor 58 detects the lifted position of the cleaning unit 1 in its recovery motion. The sensors 56, 57, 58 define position detecting means for detecting the position of the cleaning implement 10 in order to control the tractive force T.

Figure 8:
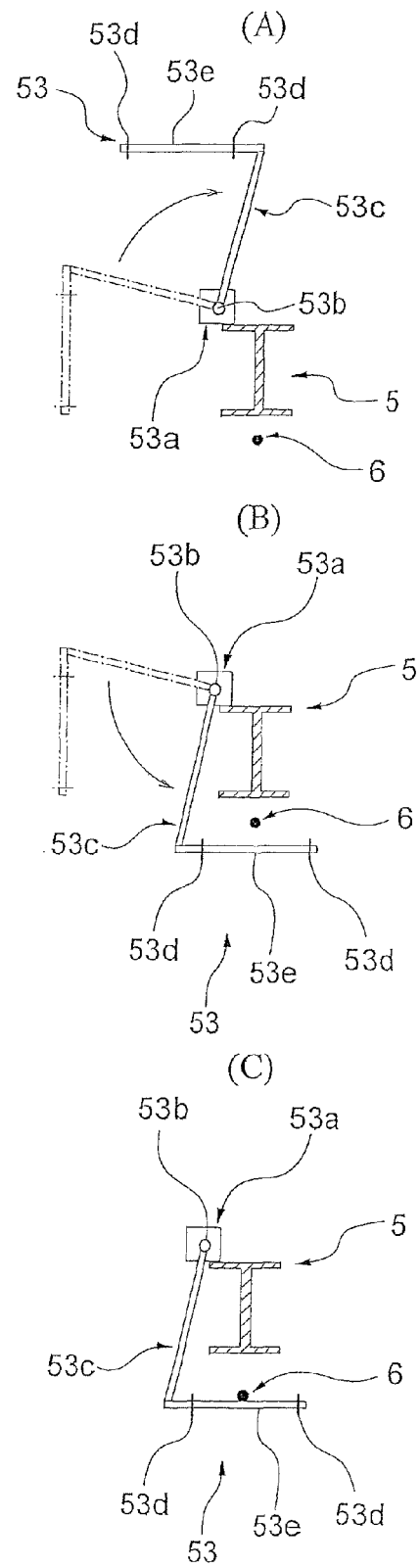
FIG. 8 is a side elevational view showing an arrangement of a cable support device provided with an L-shaped carrier.
Figure 9:
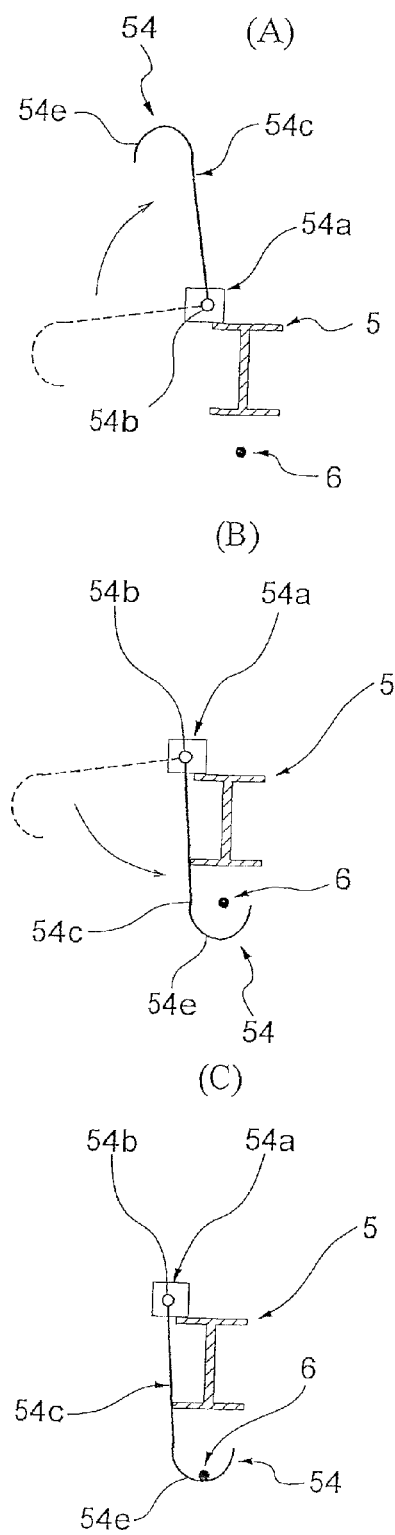
FIG. 9 is a side elevational view showing an arrangement of the cable support device provided with a hook-shaped carrier.

FIGS. 8 and 9 are the side elevational views showing the arrangements of the cable support devices 53, 54. In each of FIG. 8(A) and FIG. 9(A), a lifted position (a waiting position) of a support 53c, 54c is illustrated. In each of FIG. 8(B) and FIG. 9(B), a lowered position (a supporting position) of a support 53c, 54c is illustrated.

The cable support devices 53, 54 are provided with actuators 53a, 54a and the supports 53c, 54c, respectively. The actuators 53a, 54a are fixed on an upper surface of the trolley 5, and proximal end portions of the supports 53c 54c are fixed to a rotary drive shaft 53b, 54b of the actuators 53a, 54a. Rotation of the shaft 53b, 54b causes the support 53c, 54c to rotate about an axis of the shaft 53b, 54b, whereby the support 53c, 54c is selectively shifted to the lifted position (the waiting position) as shown by solid lines in FIG. 8(A) and FIG. 9(A) and the lowered position (the supporting position) as shown by solid lines in FIG. 8(B) and FIG. 9(B).

The support 53c as shown in FIG. 8 is made of an L-shaped metal rod having a round cross-section, which is connected to the rotary drive shaft 53b and which has a supporting shaft portion 53e and annular collars 53d attached to the shaft portion 53e. The collars 53d prevent the cable 6 to fall down from the shaft portion 53e in its lowered position (supporting position). Immediately after lowered motion of the support 53c, the cable 6 is upwardly spaced from the shaft portion 53e. As the cleaning unit 1 moves away from the support 53c, the cable 6 deflects downward, until the cable 6 is received and supported by the support 53e as depicted in FIG. 8(C). The support 54c as shown in FIG. 9 is made of a hook-shaped metal flat bar, and the support 54c in its lowered position (supporting position) accommodates the cable 6 in a hook portion 54e. As the cleaning unit 1 moves away from the support 54c, the cable 6 deflects downward, until the cable 6 is received and supported by the hook portion 54e as depicted in FIG. 9(C).

In FIG. 2, the cable support device 53 is in its lowered position (the supporting position) in which the cable 6 is supported by the support 53c. In FIG. 2, each of the cable support devices 54 is in its lowered position (the supporting position) for supporting the cable 6 on the support 54c or its lifted position (the waiting position) in which the support 54c is pivoted upward. Although the two types of cable support devices 53, 54 are employed in the present embodiment, only one or substantially same type of cable support device may be employed, or various types of cable support devices with various structures or arrangements may be employed. Further, the positions and the positional relations of the cable support devices 53, 54 shown in FIG. 2 are merely examples, and therefore, the present invention is not limited thereto. So far as the cable 6 can be suitably supported, the positions and the positional relations of the cable support devices may be appropriately modified.

Figure 10:
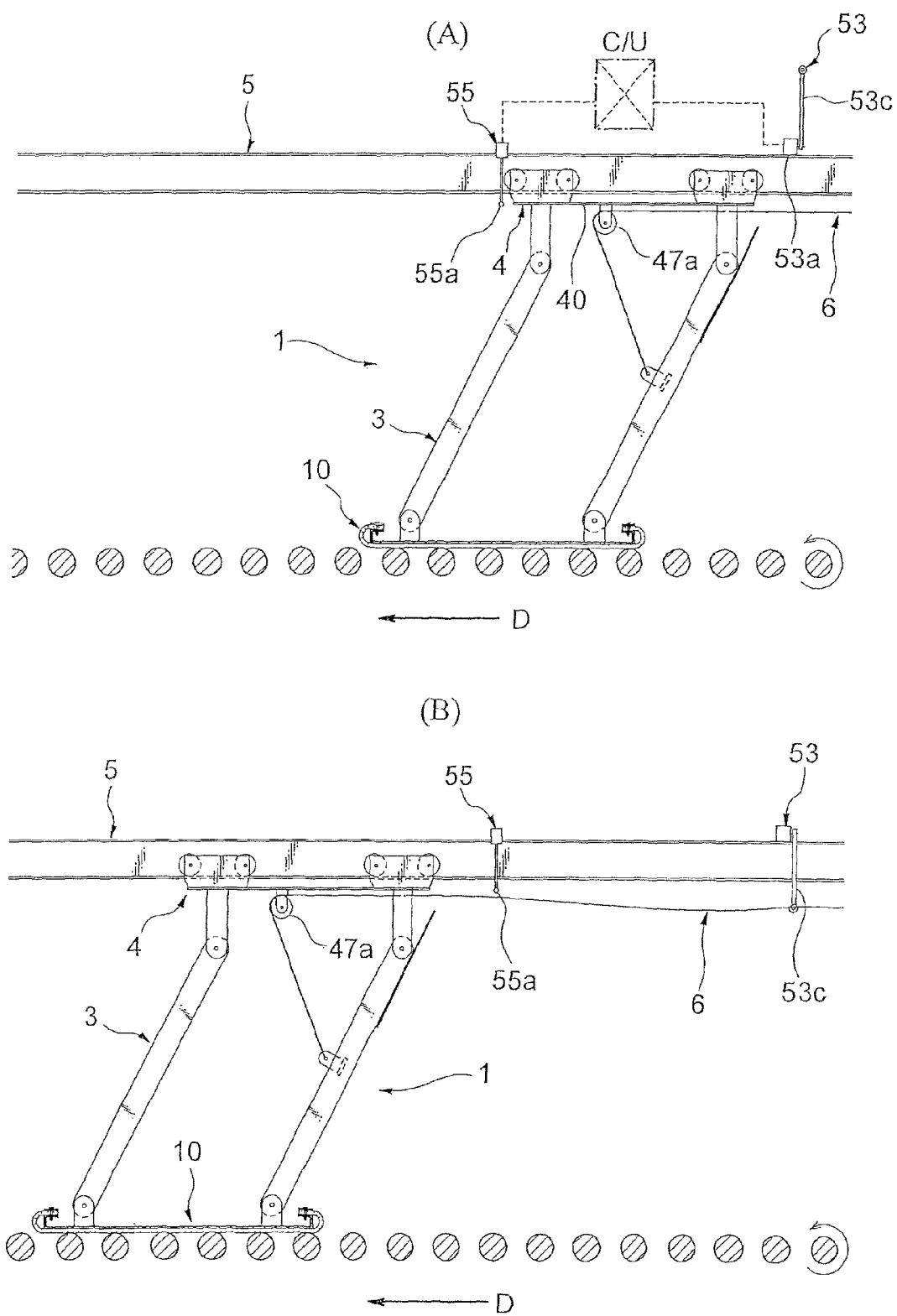
FIG. 10 is a front elevational view showing the positional relation between the cable support device and a position sensor, and a mode of operation of the cable support device and the position sensor.

FIG. 10 is the front elevational view showing the positional relation between the cable support device 53 and the position sensor 55, and the mode of operation thereof.

Each of the position sensors 55 is located forward of the cable support device 53 corresponding the position sensor 55, as seen in the conveyance direction. The position sensor 55 is provided with a contact or non-contact sensing type of detector 55a in position, which can be brought into contact with the horizontal base-plate 40 of the cleaning unit 1 or close proximity thereto. An output signal of the detector 55a is inputted to a controller part in a control unit C/U of the cleaning apparatus by means of a signal line shown by a dotted line. A driver part in the unit C/U is connected with the actuator 53a of the device 53 through a signal line shown by a dotted line.

The cleaning unit 1 moves on the roller conveyor C in the conveyance direction D with rotation of the rollers R, as shown in FIG. 10(A). In FIG. 10(A), the horizontal base-plate 40 is in a situation that the base-plate 40 moves forward to be brought into contact with or close proximity to the detector 55a of the position sensor 55. At this timing, the cable support device 53 takes the lifted position (standby position).

The detector 55a detects a conflict or approach of the horizontal base-plate 40, and the control unit C/U initiates operation of its internal timer. After expiration of a predetermined time (the delayed interval preset in the timer), the control unit C/U operates the actuator 53a to downwardly pivot the support 53c to its lowered position (supporting position).

FIG. 10(B) illustrates the situation that the support 53c is in the lowered position (supporting position). The cable 6 extending backward from the pulley 47 is supported by the shaft portion 53e of the support 53c. The cable 6 extending between the cleaning unit 1 and the electric winch 7 is intermediately supported by the support 53c, so that a distance between fulcrums is reduced. Therefore, the downward displacement (downward deflection) of the cable 6 owing to its dead load is restricted.

FIG. 10 shows the mode of operation of the cable support device 53 caused when the cleaning unit 1 moves in the conveyance direction D. However, also when the cleaning unit 1 moves in the direction opposite to the direction D (in the reverse direction E), the detector 55a detects the conflict or approach of the horizontal base-plate 40. When the control unit C/U detects the impingement or approach of the base-plate 40 by means of the detector 55a, the control unit C/U initiates operation of its internal timer. After expiration of a predetermined time (the delayed interval preset in the timer), the control unit C/U operates the actuator 53a to upwardly pivot the support 53c in order to lift the support 53c up to its lifted position (waiting position).

The timing of operation of the actuator 53a is determined on the basis of the velocity of movement of the cleaning unit 1 and the positional relation between the cable support device 53 and the detector 55a. Therefore, it is possible to set the preset time to be zero, or eliminate use of the timer, in order to employ an operating condition in that the actuator 53a is operated immediately after the contact or close proximity of the detector 55a and the base-plate 40.

Further, FIG. 10 relates to the positional relation and the mode of operation with respect to the cable support device 53 and the position sensor 55, but the positional relation and the mode of operation with respect to the device 54 and the sensor 55 are substantially the same as those shown in FIG. 10. Duplicated descriptions on those of the device 54 and the detector 55 are omitted, since the descriptions on the device 54 and the detector 55 can be made by merely substituting the reference numeral "54" for the reference numeral "53" in FIG. 10 and the above description on FIG. 10.

As illustrated in FIG. 2(B), the cleaning unit 1 moves on the conveyance passage in the reverse direction E, until the unit 1 is brought into contact with or close proximity to the position sensor 57 and the stopper 59 stepwisely, which are located near the rearward-end portion of the trolley 5 (the initial position X1). When the detector of the position sensor 57 is brought into contact with or close proximity to the horizontal base-plate 40, the control unit C/U (FIGS. 10 and 11) reduces the winding speed of the electric winch 7 on the basis of the detected result of the sensor 57. As the result, the base-plate 40 impinges against the stopper 59 with a slow action.

Figure 11:
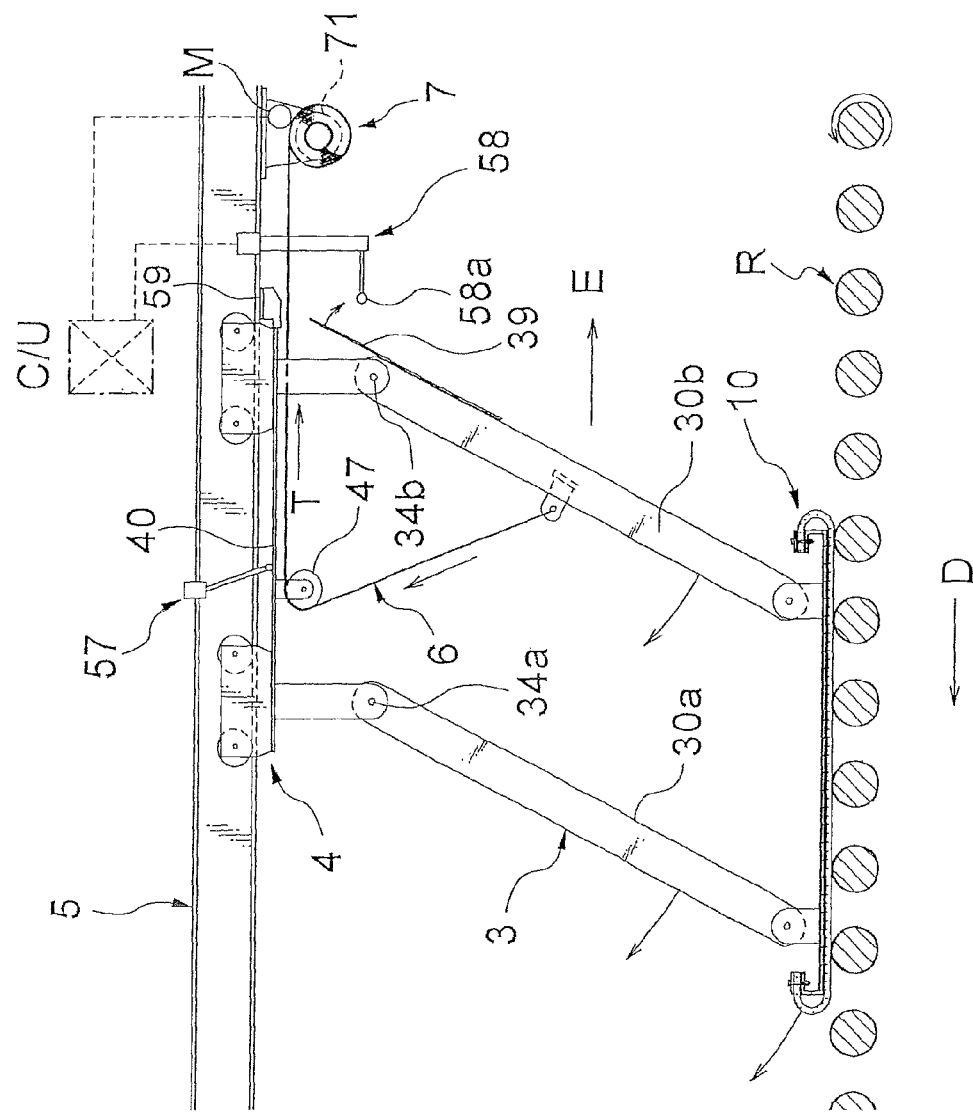
FIG. 11 is a front elevational view showing a positional relation among the cleaning unit, a stopper and the position sensor, which are illustrated in a condition that the cleaning implement is moved backward to be nearly in its initial position.

FIGS. 11 and 12 are the front elevational views showing the positional relation among the cleaning unit 1, the stopper 59 and the position sensor 58.

FIG. 11 illustrates the situation that the horizontal base-plate 40 impinges against the stopper 59. As the electric winch 7 further reels up the cable 6, the linkage member 30a, 30b are upwardly pivoted about axes of the pivot shafts 34a, 34b by the tractive force T of the cable 6, since the stopper 59 blocks the rearward movement of the base-plate 40. Since the winding velocity of the winch 7 has been reduced, the linkage members 30a, 30b are slowly lifted.

The upper-end portion of the linkage member 30b is provided with a tongue piece 39 fixed thereto and upwardly projecting therefrom. When the linkage members 30a, 30b are lifted up to the lifted position as shown in FIG. 12 (the standby position as shown in FIG. 12), the tongue piece 39 is brought into contact with or close proximity to the detector 58a of the position sensor 58, and the control unit C/U stops a driving motor M of the electric winch 7 on the basis of the result detected by the sensor 58. As the result, the cleaning implement 10 is held in the lifted position (standby position) as shown in FIG. 12, and a conveyance space Q for movement of the articles or materials W on the roller conveyor C, as shown by phantom lines, is ensured. The flexible cleaning member 12 is slightly deflected downward as shown by dotted lines in FIG. 12. The level of the lifted position (standby position) of the cleaning implement 10 is determined in such a manner that the desired conveyance space Q can be ensured even if such a downward deflection of the cleaning implement 12 occurs.

The operation of the cleaning apparatus thus arranged is described hereinafter.

The cleaning unit 1 is kept in the standby position as shown in FIG. 12, when the articles or materials are conveyed by the roller conveyor C. When the cleaning process is to be started, the drum 71 of the electric winch 7 is rotated in its unwinding direction with the roller conveyor C being kept in its operating condition (in the rotating condition of the rollers R).

The cleaning unit 1 lowers the cleaning implement 10 as shown in FIG. 11 by reeling out the cable 6 from the drum 71, whereby the cleaning face 11 is pressed against the roller R under the dead load P of the cleaning implement 10, so that the roller R is in contact with the conveyance face S (FIG. 1). The control unit C/U causes the unwinding speed of the winch 7 to be set at a relatively low velocity so far as the detector of the position sensor 57 is kept in contact with or close proximity to the horizontal base-plate 40. Therefore, the cleaning implement 10 slowly descends onto the roller R. As the cleaning implement 10 is brought into intimate contact with the conveyance face S of the roller R, the torque of the roller R is transferred to the cleaning implement 10 as the conveyance power F (FIGS. 1 and 2). Therefore, the cleaning unit 1 starts to move forward at a very slow speed. As soon as the base-plate 40 moves apart from the detector of the position sensor 57, the control unit C/U increases the unwinding velocity of the winch 7. The torque (the conveyance power F) acting on the cleaning implement 10 causes the cleaning unit 1 to slowly move in the conveyance direction (the direction D), as shown in FIGS. 10 and 2(A).

When the cleaning unit 1 passes a detective position for each of the position sensors 55, the corresponding cable support device 53, 54 lowers the support 53c, 54c under the control of the control unit C/U. Therefore, the cable 6 is subjected to an intermediate fulcrum or fulcrums, as shown in FIG. 2(A). The downward deflection of the cable 6 is limited by the support 53c, 54c, so that the cable 6 is surely prevented from being brought into contact with the roller R by the downward deflection of the cable 6.

When the cleaning unit 1 reaches the forwardmost position X2 (the reversing position) and the base-plate 40 of the trolley device 4 is brought into contact with or close proximity to the position sensor 56 as shown by the dotted lines in FIG. 2(B), the control unit C/U causes the drum 71 of the electric winch 7 to rotate in its winding direction. The cleaning unit 1 is positively moved in the direction E by means of the tractive force T of the winch 7. When the cleaning unit 1 passes the position of the position sensor 55, the corresponding cable support device 53, 54 raises the support 53c, 54c under the control of the control unit C/U. When the cleaning unit 1 moves to an area near its initial position X1, the unit 1 approaches or impinges the position sensor 57 and the stopper 59 stepwisely, so that the slowing-down operation of the unit 1 and the lifting and waiting operation of the cleaning implement 10 (FIGS. 11 and 12) are carried out stepwisely. When the position sensor 58 detects the lifting and waiting of the implement 10, the series of processes finishes.

As set forth above, the dirt or contaminant clinging on the conveyance face S (FIG. 1) of the roller R is removed therefrom and transferred to the cleaning member 12 by the water-absorbing property of the cleaning member 12, contact and separation of the cleaning face 11 and the conveyance face S, and a relative displacement of the faces 11, S.

Although the present invention has been described as to preferred embodiment, the present invention is not limited thereto, but may be carried out in any of various modifications or variations without departing from the scope of the invention as defined in the accompanying claims.

For instance, although the present invention is applied to the cleaning apparatus for cleaning the conveyance face of the roller conveyor in the aforementioned embodiment, the present invention may be applied to a cleaning apparatus for a belt conveyor.

Further, the conveyance velocity of the conveyor in the cleaning operation, the rotation speed of the roller, the tractive speed (winding speed) of the cable, and so forth can be modified in correspondence with the concrete arrangement or structure of the conveyor and the cleaning apparatus. Furthermore, an electric control system, an electronic control system, a pneumatic control system, a hydraulic control system, or the like can be employed as the control system of the cleaning apparatus.

Further, woven fabric, nonwoven fabric, felt, porous material, sponge material, aggregated fibers, and so forth, which are made of or from natural fiber, chemical fiber, synthetic resin or the like, can be appropriately employed as the cleaning member to be in contact with the conveyance face, in correspondence with the condition of the conveyance face. A composite material made of laminated materials, or a material having an embossed pattern, nap raising, irregularity, depressions, projections or the like may be employed as the cleaning member.

Furthermore, in the aforementioned embodiment of the cleaning apparatus, the dirt or contaminant on the conveyance surface is removed by the water-absorbing property of the cleaning member 12, contact and separation of the cleaning face and the conveyance face, and the relative displacement or rubbing contact of the cleaning face and the conveyance face, but the cleaning unit may be provided with liquid supply means (e.g., a nozzle) for spraying, jetting or injecting cleansing liquid, such as water or liquid detergent, and drafting or forcibly drying means (e.g., a fan) for positively drying the conveyance face. If desired, the cleaning unit may be additionally provided with a liquid-absorbing material for quickly absorbing liquid on the conveyance face. According to such a cleaning apparatus, the dirt or contaminant on the conveyance surface is washed by the water, detergent or the like, and then, water on the conveyance face is dried by air-drafting, and the remaining water is absorbed by the liquid-absorbing material, whereby cleaning and drying of the conveyance face can be quickly performed.

In addition, a liner member like a chain may be used as a traction member of the traction device, although the cable means, such as a cable, wire or rope, is used as the traction member in the aforementioned embodiment.

INDUSTRIAL APPLICABILITY

The present invention is applied to the apparatus and the method of cleaning the conveyance face of the conveyance element (the roller, the conveyor belt or the like) constituting the roller conveyor, the belt conveyor or the like. In particular, the arrangement of the present invention can be preferably applied to the cleaning apparatus and method for removing dirt or contaminants on the conveyance face, with respect to the conveyance passage for conveying raw materials, semi-processed products, half-finished products or the like, which are still in an unset, wet or reactive condition, in a producing or manufacturing process of food products, building materials, resin moldings, paper products and so forth.

The cleaning apparatus according to the present invention is arranged to utilize the conveyance power of the conveyor device so as to control the movement and operation of the apparatus by the tractive force, and therefore, the apparatus does not need a complicated driving device for rotating a cleaning part and so forth. Further, the cleaning apparatus according to the present invention can be manufactured economically and adapted for various kinds, designs or sizes of the conveyor devices. Furthermore, the cleaning operation with use of the cleaning apparatus according to the present invention is simple, efficient and labor-saving, since use of the complicated driving devices is not required. Thus, the practical advantage of the cleaning apparatus and method according the present invention is remarkable.

The invention claimed is:

1. An apparatus to clean at least one conveyance face of at least one conveyance element of a conveyor device that conveys articles or materials, the apparatus comprising:
a cleaning implement including a rigid plate and a flexible cleaning member extending underneath the rigid plate, the flexible cleaning member having a cleaning face to be brought into contact with the at least one conveyance face of the at least one conveyance element;
a traction device including a winch and a cable, the traction device coupled to the cleaning implement to apply, to the cleaning implement, a tractive force in a direction opposite to a conveyance direction of the at least one conveyance element of the conveyor device;
a trolley beam located above the cleaning implement and the at least one conveyance element, the trolley beam extending in parallel with the conveyance direction of the at least one conveyance element to guide the cleaning implement in a guiding direction and in the conveyance direction of the at least one conveyance element;
a trolley including a pulley for turning the cable, the trolley movably supported by the trolley beam;
a suspension mechanism including at least one linkage member to suspend the cleaning implement from the trolley, the at least one linkage member directed or oriented from the trolley downward and forward in the conveyance direction; and
a brake which blocks movement of the trolley in a direction of the tractive force to cause an upward swinging direction of the at least one linkage member with the cleaning implement by the tractive force,
wherein:
the rigid plate and the flexible cleaning member of the cleaning implement have a weight to keep the cleaning face of the flexible cleaning member in contact with the at least one conveyance face of the at least one conveyance element in operation of the conveyor device and to be passively moved in the conveyance direction of the at least one conveyance element toward a forwardmost position of the cleaning implement by a conveyance power of the conveyance device, while the suspended cleaning implement is loaded on the at least one conveyance element, and
an end portion of the cable directly coupled to the at least one linkage member of the suspension mechanism and the cable extends from the at least one linkage member to the winch via the pulley to transmit the tractive force to the at least one linkage member in the upward swinging direction and to transmit the tractive force, through the pulley, to the trolley in the direction opposite to the conveyance direction,
thereby causing positive movement of the cleaning implement in contact with the at least one conveyance face in the direction opposite to the conveyance direction by the tractive force, after the forward and passive movement of the cleaning implement, and causing the upward swinging of the at least one linkage member of the suspension mechanism to lift the cleaning implement up to a waiting position, by the tractive force, while the movement of the trolley in the direction opposite to the conveyance direction is blocked by the brake.

2. The apparatus as defined in claim 1, wherein the at least one linkage member of the suspension mechanism includes respective end portions pivotally coupled to the trolley and the rigid plate.

3. The apparatus as defined in claim 1, wherein the cable further includes a wire or a rope.

4. The apparatus as defined in claim 1, further comprising a position detector including at least one sensor to detect a position of the trolley, the tractive force to be applied to the cleaning implement being controlled by the traction device, on a basis of a detected result of the position detector.

5. The apparatus as defined in claim 1,
wherein L-shaped or hook-shaped members to intermediately support the cable in relation with a position of the trolley are located on the trolley beam and spaced a distance from each other, to prevent the cable from being brought into contact with the at least one conveyance element.

6. The apparatus as defined in claim 5, further comprising a position detector including at least one sensor to detect a position of the trolley, wherein the L-shaped or hook-shaped members selectively support or release the cable, on basis of the position detected by the position detector.

7. The apparatus as defined in claim 1, wherein the flexible cleaning member has a water-absorbing property.

8. The apparatus as defined in claim 1, wherein:
the at least one conveyance element is any one of a roller of a roller conveyor, or a conveyor belt of a belt conveyor, at least one upper face of the roller or conveyor belt defines the at least one conveyance face,
the flexible cleaning member being deformable so as to be in intimate contact with the at least one upper face, and
during the operation the conveyor device while the tractive force is reduced, the flexible cleaning member cleans the roller or the conveyor belt by contact and separation of the cleaning face of the flexible cleaning member and the at least one upper face, and a relative displacement therebetween, and the contact, separation and displacement depend on a difference between a circumferential velocity or moving velocity of the upper face and a moving velocity of the flexible cleaning member.

9. An apparatus to clean at least one conveyance face of at least one conveyance element of a conveyor device that conveys articles or materials, the apparatus comprising:
a cleaning implement including a rigid plate and a flexible cleaning member extending underneath the rigid plate, the flexible cleaning member having a cleaning face to be brought into contact with the at least one conveyance face of the at least one conveyance element;
a traction device including a winch and a cable, the traction device coupled to the cleaning implement to apply, to the cleaning implement, a tractive force in a direction opposite to a conveyance direction of the at least one conveyance element of the conveyor device;
a trolley beam located above the cleaning implement and the at least one conveyance element, the trolley beam extending in parallel with the conveyance direction of the at least one conveyance element to guide the cleaning implement in a guiding direction and in the conveyance direction of the at least one conveyance element;
a trolley including a pulley for turning the cable, the trolley movably supported by the trolley beam;
a suspension mechanism including at least one linkage member to suspend the cleaning implement from the trolley, the at least one linkage member directed or oriented from the trolley downward and forward in the conveyance direction;

L-shaped or hook-shaped members located on the trolley beam, spaced a distance from each other, to intermediately support the cable which is downwardly displaced or deflected in relation with a position of the trolley and a dead load of the cable when the cleaning implement moves away from at least one of the L-shaped or hook-shaped members;

actuators, each of which is connected with each of the L-shaped or hook-shaped members to shift each of the L-shaped or hook-shaped members to a supporting position for supporting the cable to restrict a downward displacement or deflection of the cable and to prevent the cable from being brought into contact with the at least one conveyance element, or a waiting position for releasing the cable, selectively;

a position detector including at least one sensor to detect a position of the trolley; and a controller to operate each of the actuators to selectively shift each of the L-shaped or hook-shaped members to either of the supporting position or the waiting position, on basis of the position of the trolley detected by the position detector, wherein:

the rigid plate and the flexible cleaning member of the cleaning implement have a weight to keep the cleaning face of the flexible cleaning member in contact with the at least one conveyance face of the at least one conveyance element in operation of the conveyor device and to be passively moved in the conveyance direction of the at least one conveyance element toward a forwardmost position of the cleaning implement by a conveyance power of the conveyor device, while the suspended cleaning implement is loaded on the at least one conveyance element, and an end portion of the cable directly coupled to the at least one linkage member of the suspension mechanism and the cable extends from the at least one linkage member to the winch via the pulley to transmit the tractive force, through the pulley, to the trolley in the direction opposite to the conveyance direction, thereby positively moving the cleaning implement in contact with the at least one conveyance face in the direction opposite to the conveyance direction by the tractive force, after the forward and passive movement of the cleaning implement.

10. The apparatus as defined in claim 9, wherein the at least one linkage member of the suspension mechanism includes respective end portions pivotally coupled to the trolley and the rigid plate.

11. The apparatus as defined in claim 9, wherein the cable further includes a wire or a rope.

12. The apparatus as defined in claim 9, wherein the tractive force to be applied to the cleaning implement is controlled by the traction device, on a basis of a detected result of said position detector.

13. The apparatus as defined in claim 9, wherein the flexible cleaning member has a water-absorbing property.

14. The apparatus as defined in claim 9, wherein:

the at least one conveyance element is any one of a roller of a roller conveyor, or a conveyor belt of a belt conveyor, at least one upper face of the roller or conveyor belt defines the at least one conveyance face, the flexible cleaning member being deformable so as to be in intimate contact with the at least one upper face, and during the operation the conveyor device while the tractive force is reduced, the flexible cleaning member cleans the roller or the conveyor belt by contact and separation of the cleaning face of the flexible cleaning member and the at least one upper face, and a relative displacement therebetween, and the contact, separation and displacement depend on a difference between a circumferential velocity or moving velocity of the upper face and a moving velocity of the flexible cleaning member.

* * * * *